(12) United States Patent
Hazen

(10) Patent No.: US 8,899,088 B1
(45) Date of Patent: Dec. 2, 2014

(54) PIPE HOMING TOOL AND METHOD

(76) Inventor: Marc Hazen, Port Orange, FL (US)

(*) Notice: Subject to any disclaimer, the term of this patent is extended or adjusted under 35 U.S.C. 154(b) by 46 days.

(21) Appl. No.: 13/269,978

(22) Filed: Oct. 10, 2011

Related U.S. Application Data

(60) Provisional application No. 61/410,200, filed on Nov. 4, 2010.

(51) Int. Cl.
  *B21D 31/00* (2006.01)
  *B21D 11/00* (2006.01)
  *B21D 11/02* (2006.01)

(52) U.S. Cl.
  USPC .................................. 72/292; 72/297; 72/305

(58) Field of Classification Search
  USPC .................. 72/292, 293, 302–305, 308, 309;
  24/68 CT, 19–286, 68 R, 68 CS;
  269/130
  See application file for complete search history.

(56) References Cited

U.S. PATENT DOCUMENTS

| | | | | |
|---|---|---|---|---|
| 2,921,489 A * | 1/1960 | Schweitzer | ........................ | 81/69 |
| 3,512,229 A * | 5/1970 | Phariss | ........................ | 24/280 |
| 4,586,647 A * | 5/1986 | Dearman | ........................ | 228/49.3 |
| 6,382,610 B1 * | 5/2002 | Corbin | ........................ | 269/130 |
| 6,641,124 B2 * | 11/2003 | Melanson | ........................ | 269/43 |
| 8,152,139 B2 * | 4/2012 | Wang | ........................ | 254/237 |

* cited by examiner

*Primary Examiner* — Shelley Self
*Assistant Examiner* — Mohammad Nourbakhsh
(74) *Attorney, Agent, or Firm* — H. John Rizvi; Gold & Rizvi P.A

(57) ABSTRACT

A pipe homing tool includes a plurality of clamps each having a clamp cavity, a chain extending through the clamp cavity of each of the plurality of clamps and a binder engaging the chain and adapted to selectively shorten and lengthen the chain.

19 Claims, 12 Drawing Sheets

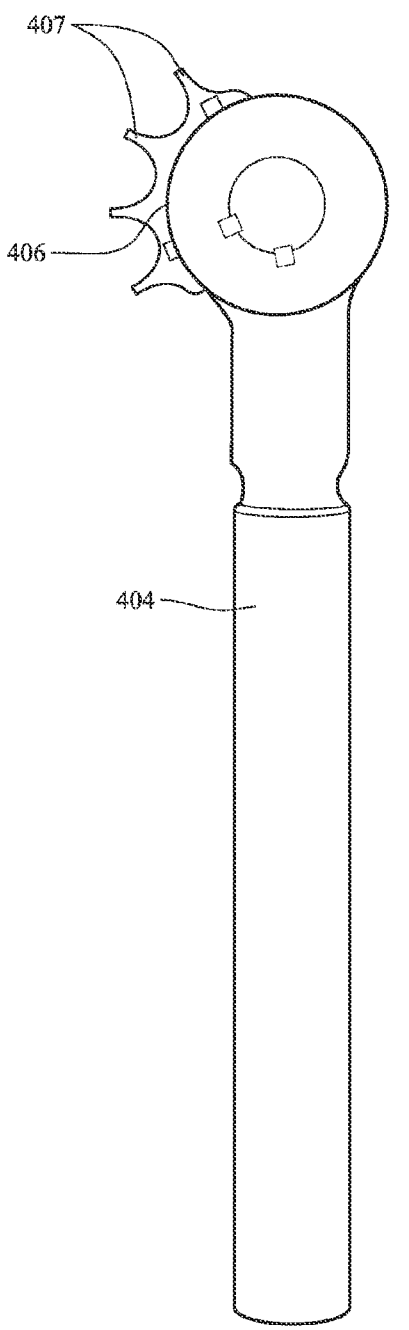
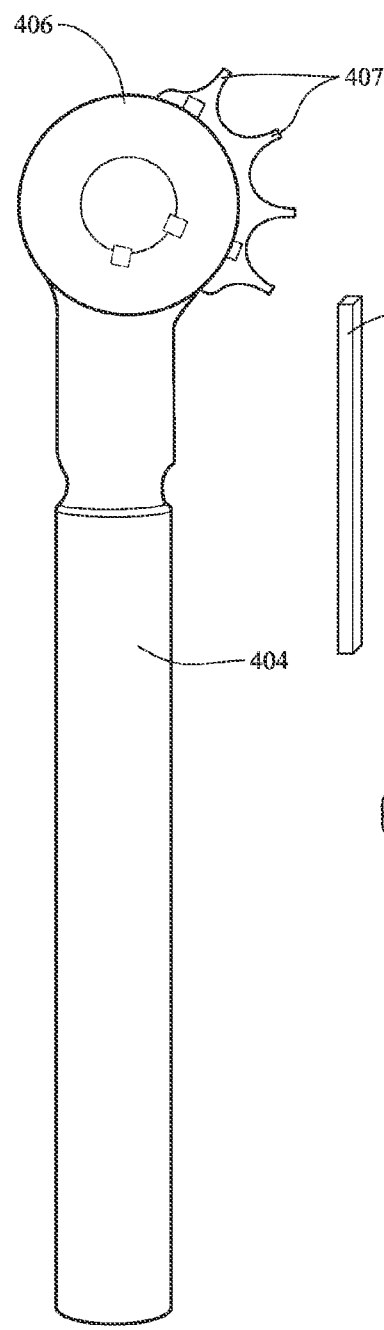
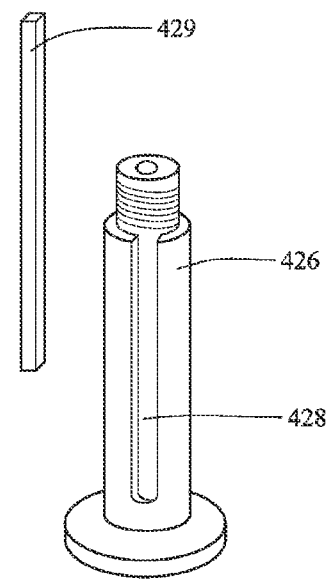
*FIG. 16*  *FIG. 17*

PIPE HOMING TOOL AND METHOD

CROSS-REFERENCE TO RELATED APPLICATIONS

This application claims the benefit of U.S. Provisional Application No. 61/410,200, filed Nov. 4, 2010 and entitled "PIPE HOMING TOOL AND METHOD".

FIELD OF THE INVENTION

The present disclosure generally relates to pipe homing tools and methods of using pipe homing tools. More particularly, the present disclosure relates to a pipe homing tool which homes the joint ends of pipe members which are to be joined to each other and a method of using the pipe homing tool.

BACKGROUND OF THE INVENTION

Piping is used in a variety of industries and can be used to convey fluids, cables and other objects or substances over long distances. For example, subterranean piping is commonly used in municipalities to convey potable water, sewage and cables. In cable-conveying applications, the distance across which the cable must be conveyed may exceed the length of a single pipe segment. Therefore, multiple pipe segments are designed in such a way as to be easily connected to one another to ensure that the assembled pipe traverses the required distance.

An example of a pipe segment which is used in municipal applications is known as a AWWA c900 pipe segment and is tapered at one end (known as the spigot end) and flared at the opposing end, forming an outer bell. The spigot end of an inner pipe segment is dimensioned to fit into the complementary outer bell of an adjoining outer pipe segment. In order to prevent leaks, ensure proper internal pipe pressure and prevent exposure to subterranean elements, a gasket lines a recess inside the outer bell. The gasket is shaped in such a way that when the spigot end of the inner pipe segment is inserted to a preferred depth within the outer bell of an adjacent outer pipe segment, the gasket deforms and seals the joint from exterior conditions. The depth at which the spigot end of the inner pipe segment is inserted into the outer bell of the outer pipe segment may be indicated with a stop mark on the surface of the inner pipe segment. The process of inserting the spigot end of the inner pipe segment to the preferred depth within the outer bell of the receiving outer pipe segment is referred to as homing the pipe.

If a pipe segment is improperly homed, proper sealing between the pipe segments may not occur. This may be costly to the contractors or municipalities who install the piping, as the improperly-homed pipe may require repair or replacement. One circumstance which can cause improper homing is environmental conditions. In general, since municipal piping is laid underground, a problem which arises when attempting to home a pipe is that the marker on the inner pipe gets covered with dirt, mud, or the like, thereby obscuring the marker. Once the marker cannot be seen, workers are no longer able to easily ensure that the inner pipe is properly homed.

What is desired is a tool and a method for ensuring that a pipe segment is properly and easily homed, regardless of marker visibility, so that the pipe segment may be properly homed for use in any weather or working conditions.

SUMMARY OF THE INVENTION

The disclosure is generally directed to a tool and method for homing pipe.

A first aspect of the disclosure provides a pipe homing tool which may include:

at least three clamps fabricated of a rigid material and defined by a proximal side wall, a distal side wall, a bottom face, a support rod, and a central cavity;

a chain; and a binder able to apply tension to the chain, wherein the chain passes through the central cavity of each clamp and is connected at either end to the binder.

In another aspect of the device, each clamp may be plastic.

In a further aspect of the pipe homing tool, the bottom face of the clamp may be shaped so as to immobilize each clamp against the surface of a pipe segment.

In another aspect of the pipe homing tool, the bottom face of each clamp may be fitted with multiple teeth.

In yet another aspect of the pipe homing tool, the bottom face of each clamp may include a configuration of spikes.

In yet another aspect of the pipe homing tool, the support rod may extend from the proximal side to the distal side at a height above the bottom face of each clamp such that the chain may be threaded through the support rod and the bottom face.

In a further aspect of the pipe homing tool, the tool may be used on a pipe having a surface, a spigot end at one end, an outer bell at the opposing end and a stop mark.

In another aspect of the pipe homing tool, the chain may be sufficiently long to substantially surround the spigot end of a pipe segment.

In another aspect of the pipe homing tool, the chain may be threaded through the central cavities of the clamps in such a way that the proximal side and bottom face of each clamp is aligned.

In another aspect of the pipe homing tool, the clamps and the chain may be placed around the spigot end of the pipe segment in such a manner that the bottom face of each clamp is in contact with the surface of the pipe and the proximal side of each clamp is aligned with the stop mark.

In yet another aspect of the pipe homing tool, both ends of the chain may be attached to the binder.

In another aspect of the pipe homing tool, the tension of the chain may be adjusted with a binder.

In another aspect of the pipe homing tool, the chain, the clamps and the binder may be removed from the pipe using a release mechanism.

In another aspect, the present disclosure provides a method for ensuring that a pipe is properly homed which comprises:

threading a chain through three or more clamps fabricated of a rigid material defined by a proximal side wall, a distal side wall, a bottom face, a support rod, and a central cavity in such a way that proximal side and bottom face of each clamp is aligned;

placing the chain and clamps around a spigot end of an inner pipe segment so that the bottom face of each clamp comes in contact with the surface of the inner pipe segment;

spacing the clamps evenly around the inner pipe segment;

attaching either end of the chain to a binder;

aligning the proximal side of each clamp to a spot mark on the spigot end of the inner pipe segment;

tightening the chain using the binder, inserting the spigot end of the inner pipe segment into an outer bell of an outer pipe segment until the outer bell contacts the clamps; and removing the chain, the clamps and the binder from the inner pipe segment.

These and other advantages of the disclosure will be further understood and appreciated by those skilled in the art by reference to the following written specification, claims and appended drawings.

BRIEF DESCRIPTION OF THE DRAWINGS

The disclosure will now be described, by way of example, with reference to the accompanying drawings, where like numerals denote like elements and in which:

FIG. 16 presents a left side view of a binder lever and chain gear with gear teeth of the exemplary binder.

FIG. 17 presents a right side view of the binder lever of the exemplary binder.

FIG. 18 presents an exploded perspective view of a gear mount bolt and bolt rod of the exemplary binder.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
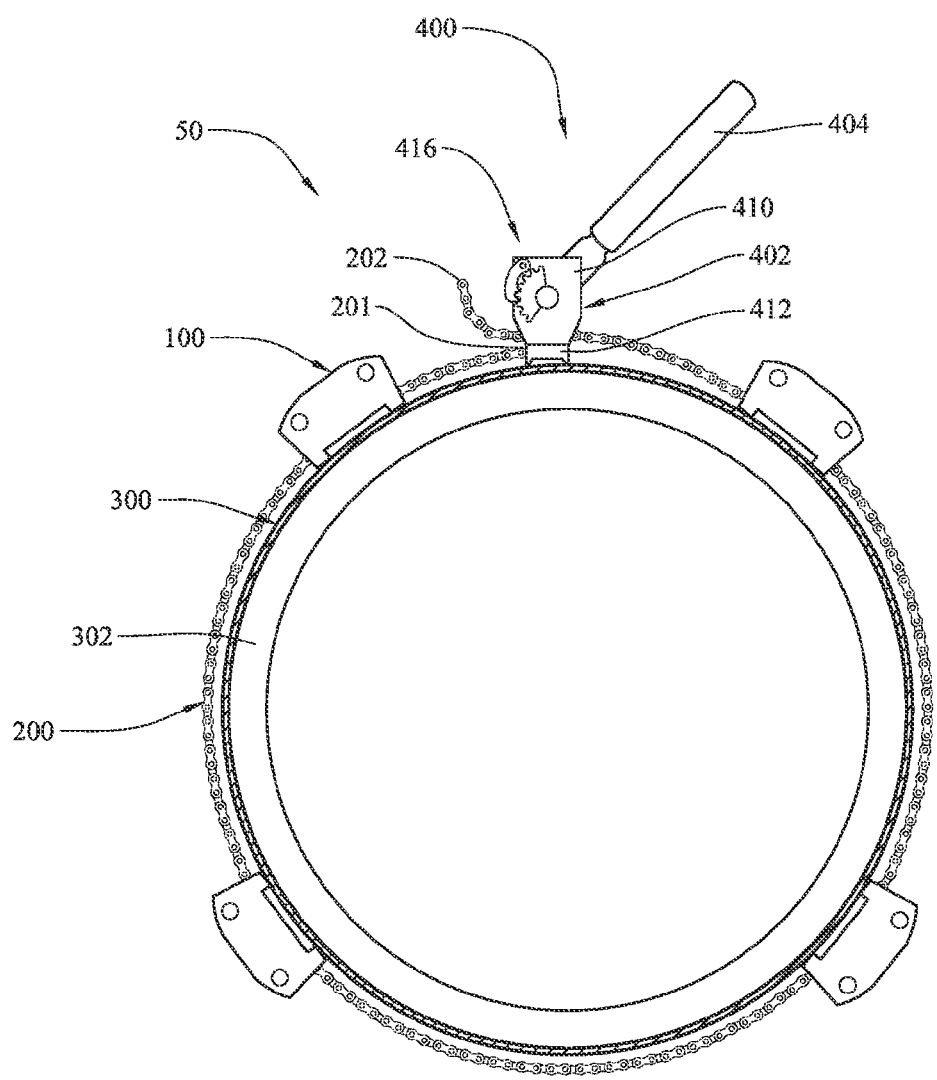
FIG. 6 presents a front view of the inner pipe with multiple clamps engaging an exterior surface of the pipe and a chain extending through the clamps in exemplary application of an illustrative embodiment of the pipe homing tool.
Figure 9:
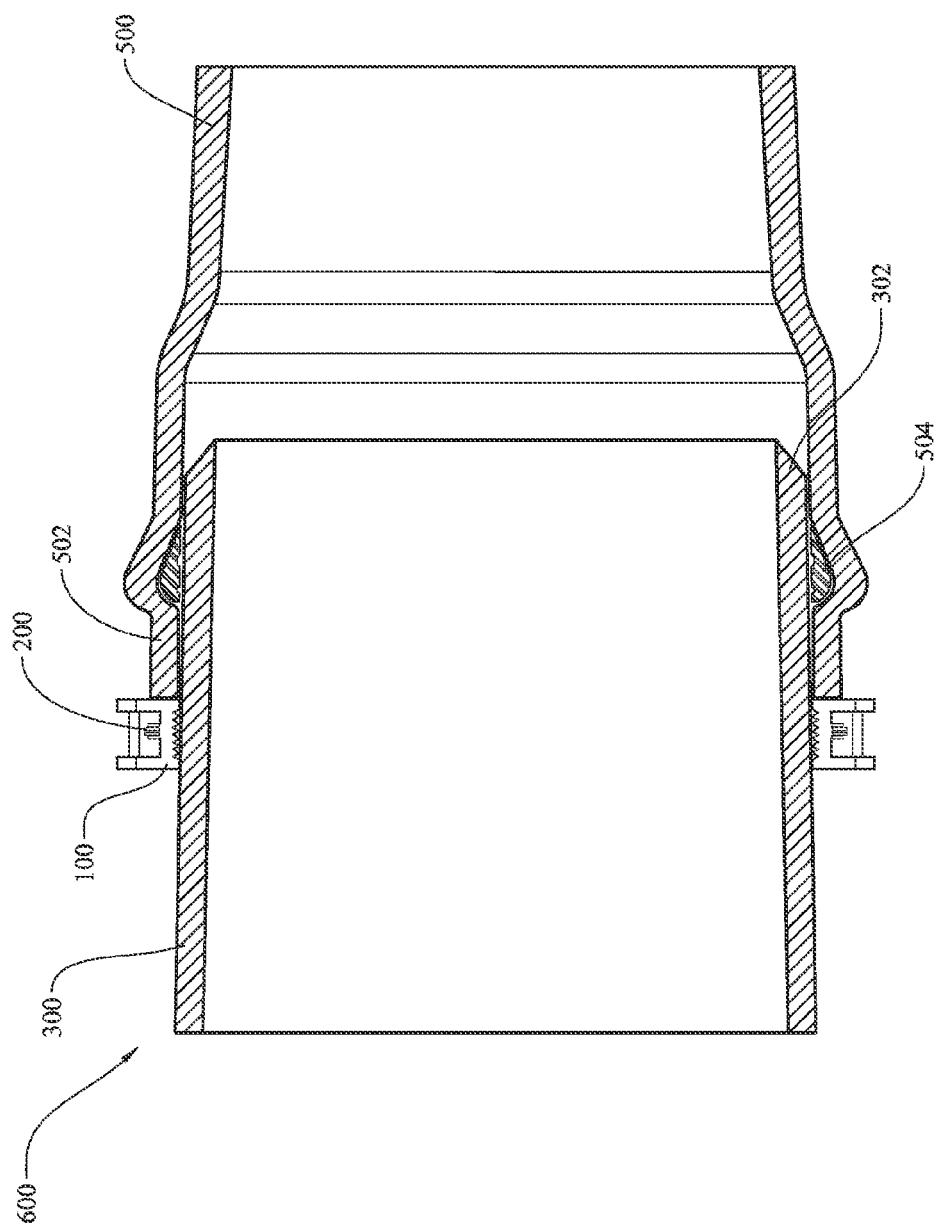
FIG. 9 presents a cross-sectional view of a pipe joint in exemplary application of an illustrative embodiment of the pipe homing tool.
Figure 10:
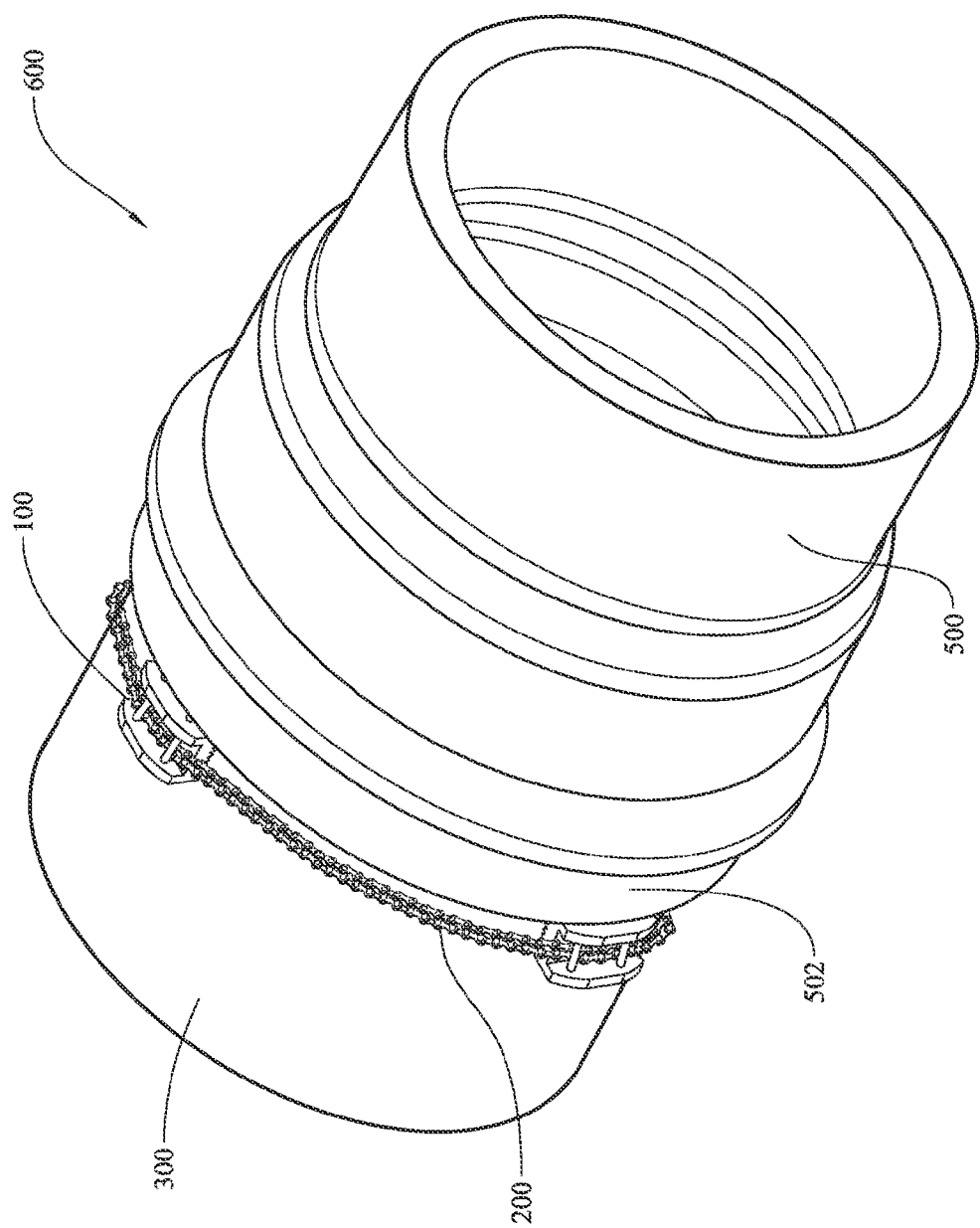
FIG. 10 presents a perspective view of the pipe joint as shown in FIG. 9.

Referring initially to FIG. 6 of the drawings, an illustrative embodiment of a pipe homing tool is generally indicated by reference numeral 50. As will be hereinafter described, the pipe homing tool 50 may be used to ensure that an inner pipe segment 300 is properly homed to facilitate adjoining of the pipe segment 300 to an adjacent outer pipe segment 500 (FIG. 9). The pipe homing tool 50 may include multiple clamps 100, at least one chain 200 which engages the clamps 100 and at least one binder 400 which engages the chain 200 and is operable to selectively tighten the chain 200 and secure the clamps 100 against the pipe segment 300. In some embodiments, the pipe homing tool 50 may include four clamps 100, as illustrated in FIG. 6.

Figure 2:
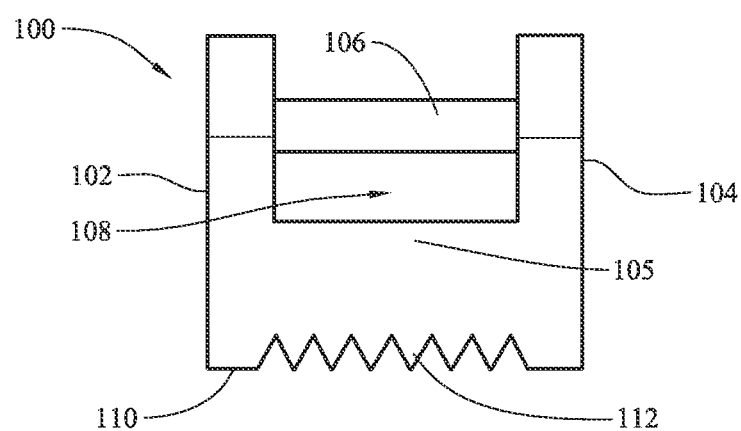
FIG. 2 presents a front view of the clamp as shown in FIG. 1.
Figure 3:
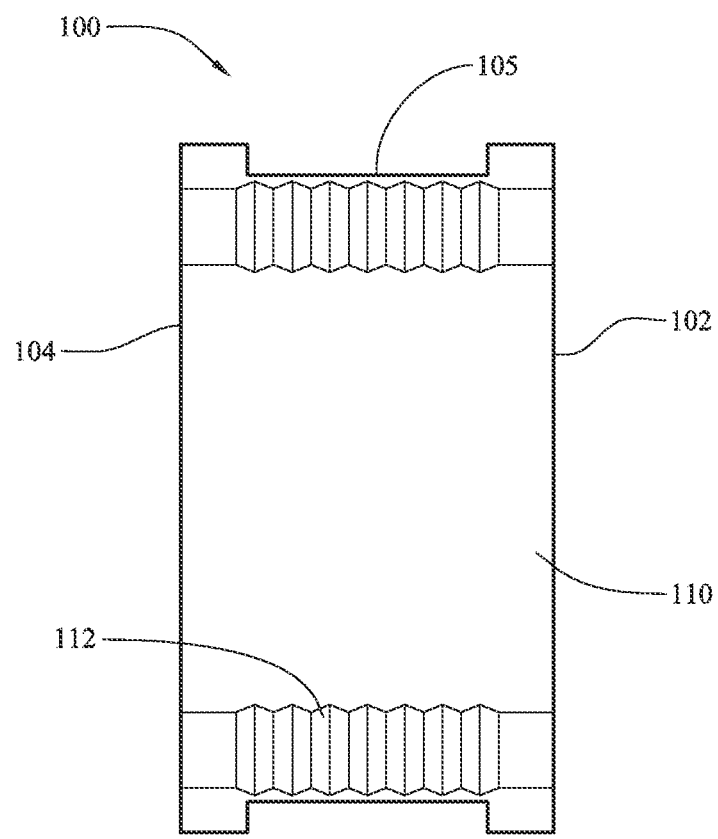
FIG. 3 presents a bottom view of the clamp as shown in FIG. 1.
Figure 4:
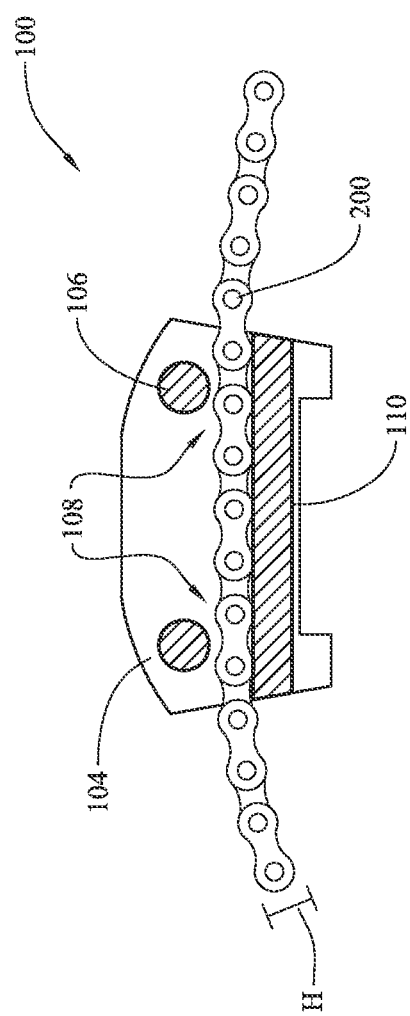
FIG. 4 presents a cross sectional view of the clamp as shown in FIG. 1 with a chain passing under a support rod of the clamp.

Referring next to FIGS. 1-4 of the drawings, each clamp 100 may include a proximal side wall 102, a distal side wall 104 which is spaced-apart with respect to the proximal side wall 102 and a connecting wall 105 which extends between and joins the proximal side wall 102 and the distal side wall 104. In some embodiments the proximal side wall 102, the distal side wall 104 and the connecting wall 105 may be generally elongated, as illustrated. The connecting wall 105 may have a clamp bottom face 110. A clamp cavity 108 may be defined by and between the proximal side wall 102 and the distal side wall 104. At least one transverse clamp support rod 106 may traverse the clamp cavity 108 between the proximal side wall 102 and the distal side wall 104 at a spacing of at least "H" (FIG. 4) with respect to the connecting wall 105. As shown in FIG. 4, the spacing "H" may correspond to the thickness of the chain 200. The clamp cavity 108 may be sized and dimensioned to accommodate the chain 200. In some embodiments, each clamp 100 may be plastic; however, it is understood that in other embodiments the clamp 100 may be metal, composite material and/or any other suitable rigid material.

Figure 1:
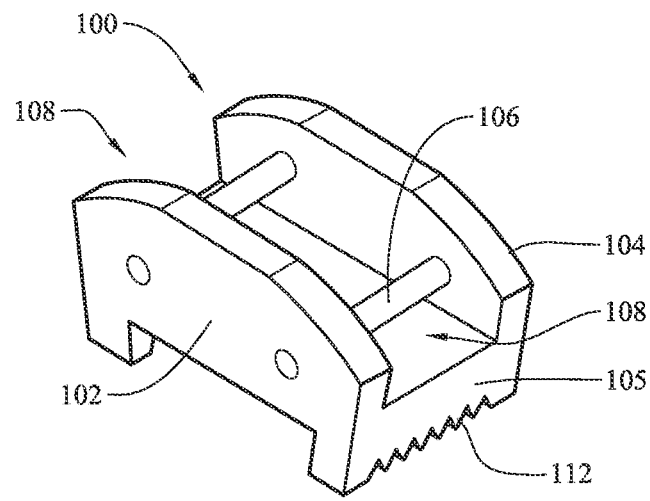
FIG. 1 presents a perspective view of a clamp in accordance with an illustrative embodiment of the pipe homing tool.

As shown in FIGS. 1-3, in some embodiments, multiple clamp teeth 112 may be provided in the clamp bottom face 110 of the connecting wall 105 of each clamp 100. The clamp teeth 112 may be oriented in parallel relationship with respect to a longitudinal axis of the connecting wall 105. In application of the pipe homing tool 50, which will be hereinafter described, the clamp teeth 112 engage the exterior surface of the pipe segment 300 (FIG. 5) to immobilize the clamp 100 with respect to the pipe segment 300. While depicted in the drawings as multiple adjacent rows of teeth 112, it is understood that in some embodiments multiple spikes (not illustrated) and/or other structural elements may be provided on the clamp bottom face 110 for the purpose.

Referring next to FIGS. 7, 8 and 11-15 of the drawings, an exemplary binder 400 of the pipe homing tool 50 may include a binder housing 402. In some embodiments, the binder housing 402 may include a pair of generally elongated, parallel, spaced-apart binder housing sidewalls 410. A binder housing connecting wall 412 may extend between and join the binder housing sidewalls 410 to each other. A binder housing interior 414 may be defined by and between the binder housing sidewalls 410 and the binder housing connecting wall 412.

Figure 15:
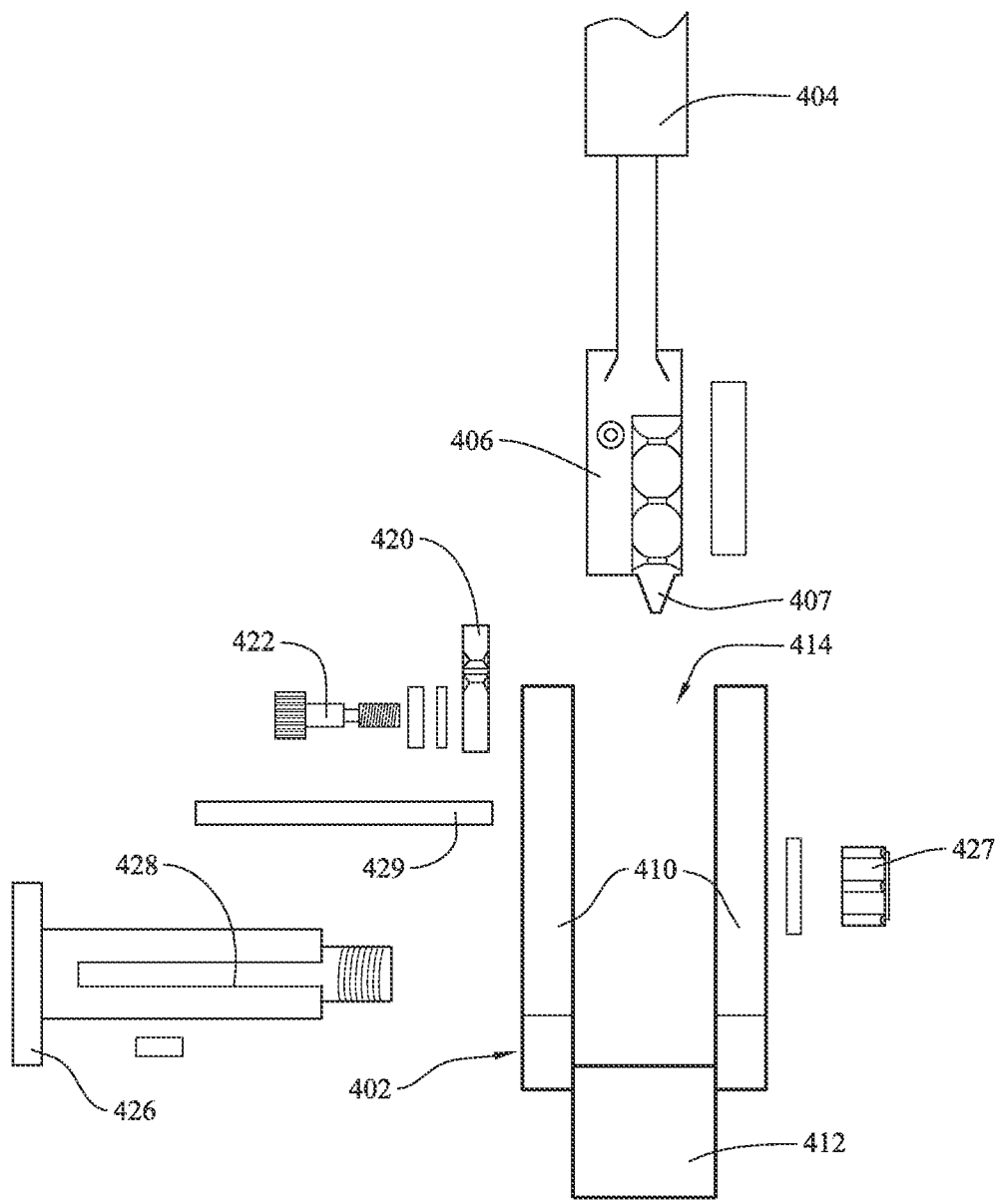
FIG. 15 presents an exploded view of the exemplary binder.

A chain gear 406 having gear teeth 407 may be journaled for rotation between the binder housing sidewalls 410 in the binder housing interior 414 of the binder housing 402. As shown in FIG. 15, in some embodiments, a gear mount bolt 426 may be extended through registering gear mount bolt openings (not illustrated) in the respective binder housing sidewalls 410 of the binder housing 402 and through a registering bolt opening (not illustrated) in the chain gear 406. A securing nut 427 may be threaded on the gear mount bolt 426. A generally elongated binder lever 404 may extend from the chain gear 406 and protrude from the binder housing interior 414 of the binder housing 402.

Figure 12:
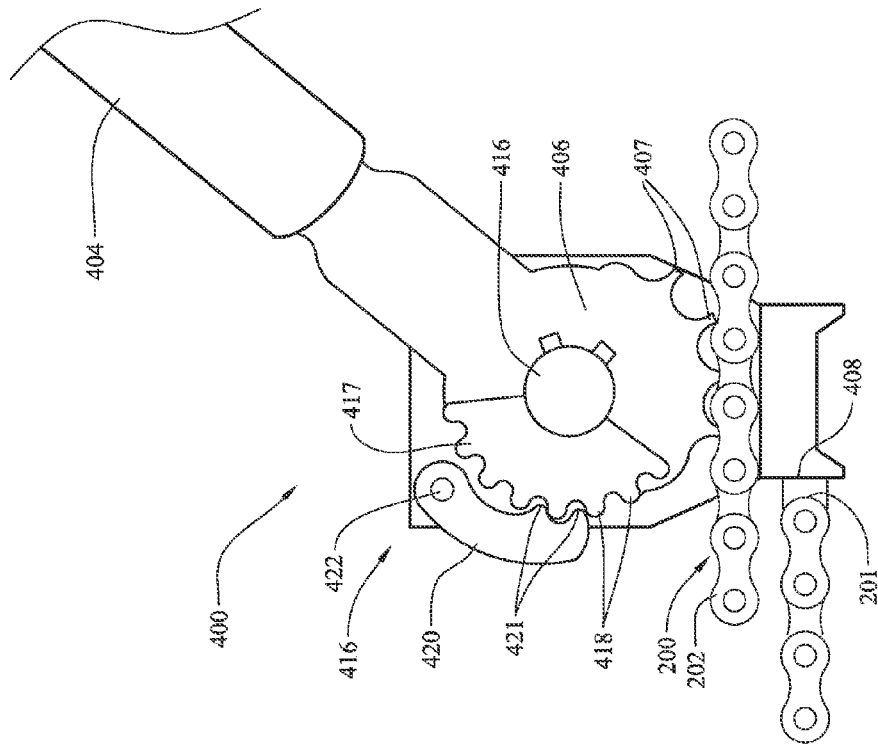
FIG. 12 presents a side view of an exemplary binder in accordance with an illustrative embodiment of the pipe homing tool, with the chain gear of the binder engaging the chain of the pipe homing tool.
Figure 11:
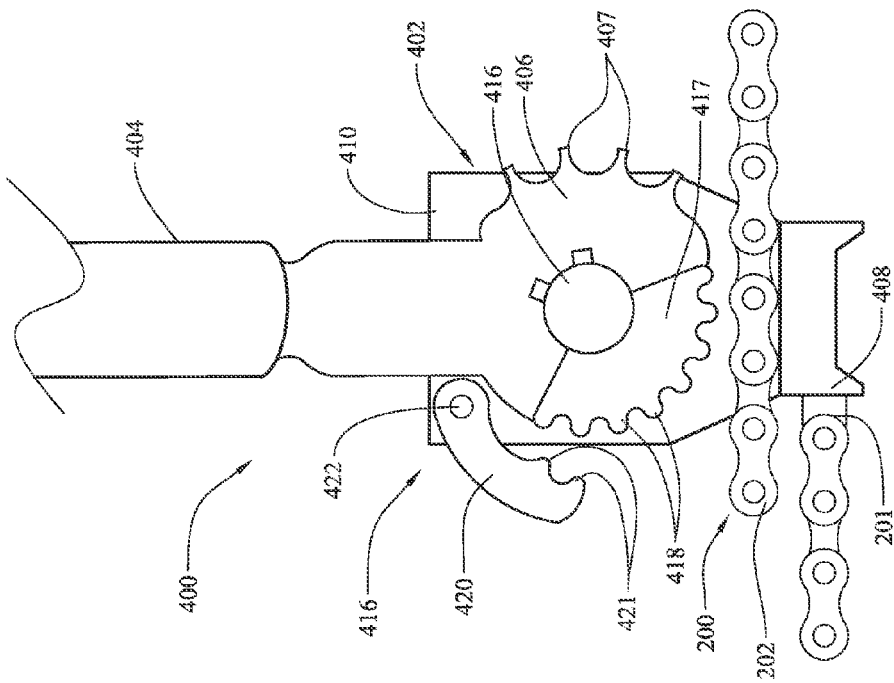
FIG. 11 presents a side view of an exemplary binder in accordance with an illustrative embodiment of the pipe homing tool, with a chain gear of the binder disengaging a chain of the pipe homing tool.
Figures 13, 14:
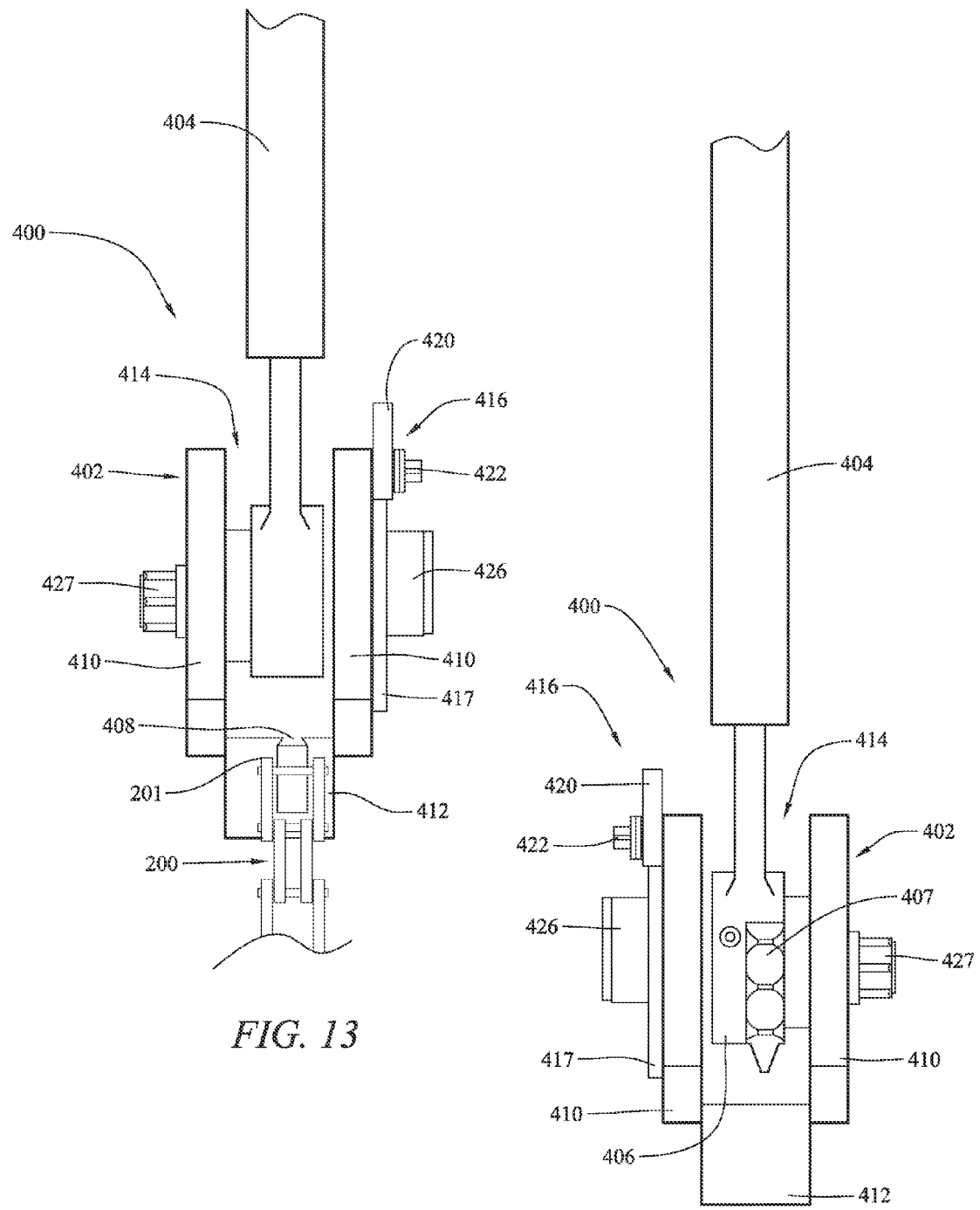
FIG. 13 presents a front view of the exemplary binder.
FIG. 14 presents a rear view of the exemplary binder.

In some embodiments, the binder 400 may include a ratchet mechanism 416. The ratchet mechanism 416 may include a ratchet plate 417 which has ratchet plate teeth 418 and is provided on the gear mount bolt 416. As illustrated in FIGS. 13 and 14, the ratchet plate 417 may be disposed outside one of the binder housing sidewalls 410 of the binder housing 402. As illustrated in FIG. 15, the gear mount bolt 426 may have at least one elongated key slot 428. A ratchet key 429 may be seated in each key slot 428. The ratchet key 428 may engage the ratchet plate 417 at a key notch (not illustrated) in the ratchet plate 417, for example and without limitation. Accordingly, the ratchet plate 417 moves with the rotating chain gear 406 as the binder lever 404 is pivoted or rotated in the binder housing interior 414 of the binder housing 402. A pawl 420 having pawl teeth 421 may be pivotally attached to one of the binder housing sidewalls 410 via a pivot bolt 422. Therefore, as illustrated in FIG. 11, the pawl teeth 421 of the pawl 420 disengage the ratchet plate teeth 418 of the ratchet plate 417 to facilitate free rotation of the chain gear 406 in the binder housing 402. As illustrated in FIG. 12, the pawl teeth 421 of the pawl 420 engage the ratchet plate teeth 418 of the ratchet plate 417 to prevent rotation of the chain gear 406 in the binder housing 402.

Figure 7:
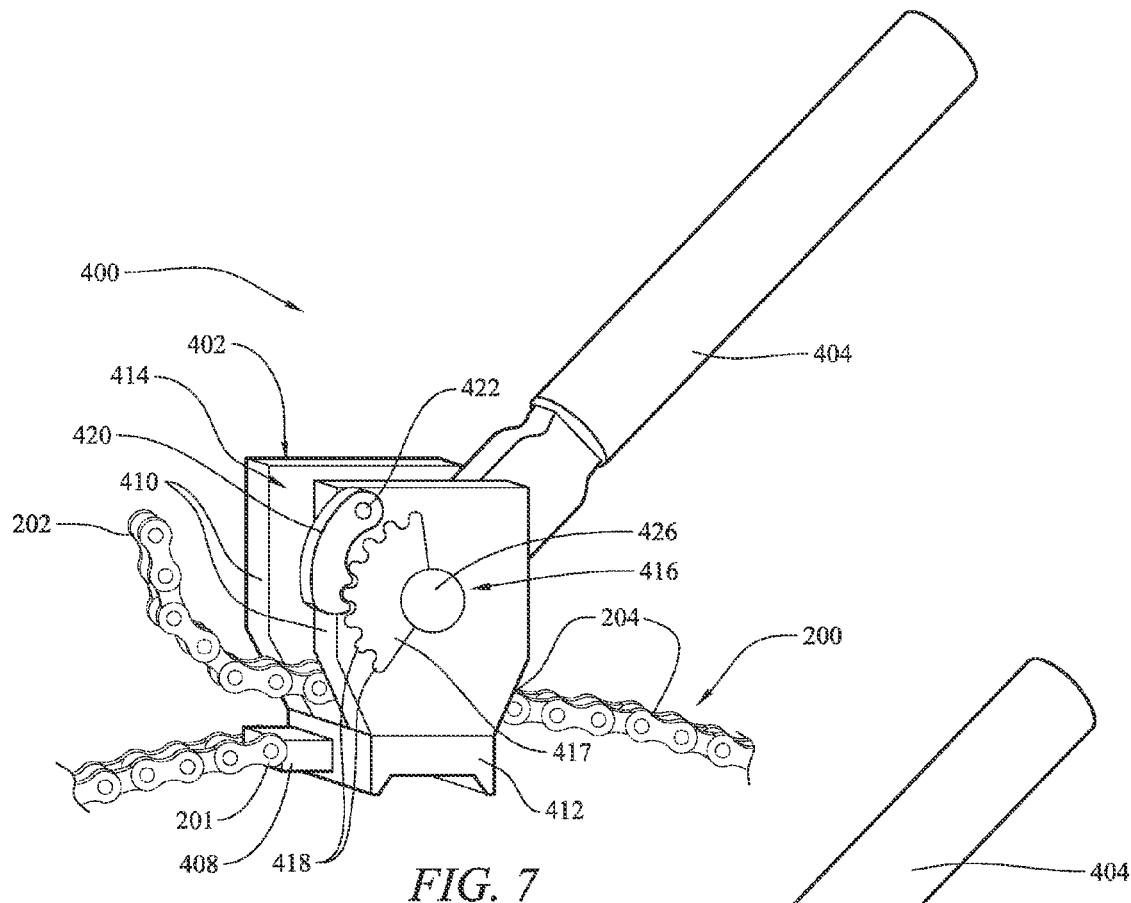
FIG. 7 presents a perspective view of an exemplary binder in accordance with an illustrative embodiment of the pipe homing tool.
Figure 8:
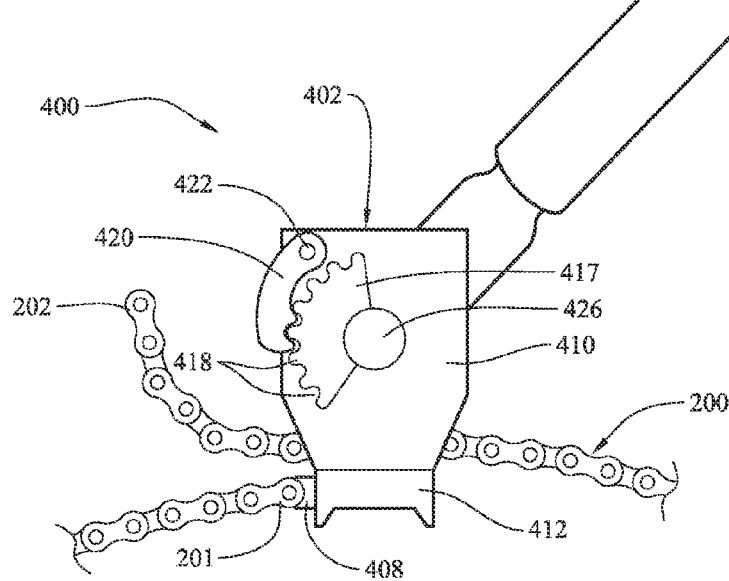
FIG. 8 presents a cross-sectional view of the binder as shown in FIG. 7.

As illustrated in FIGS. 7 and 8, in some embodiments, the chain 200 may have a chain fixed end 201 and a chain free end 202 which is opposite the chain fixed end 201. The chain fixed end 201 may be affixed to the binder housing connecting wall 412 or other component of the binder housing 402 at a chain connection point 408. As illustrated in FIG. 12, the gear teeth 407 of the chain gear 406 mesh with the chain free end 202 of the chain 200. Accordingly, as the binder lever 404 is pivoted or rotated in the binder housing interior 414 of the binder 400, the chain gear 406 rotates in the direction in which the binder lever 404 is pivoted or rotated. As the chain gear 406 rotates, the gear teeth 407 are progressively introduced into subsequent chain link cavities 204 (FIG. 7) of the chain 200, thereby advancing the chain 200 through the binder housing interior 414. Thus, the binder 400 progressively shortens or tightens the chain 200. The pawl teeth 421 of the pawl 420 engages the ratchet teeth 418 of the ratchet plate 417 to prevent rotation of the chain gear 406 and linear movement of the chain 200 in the opposite direction. In alternative embodiments, the binder 400 may include a winch, geared screw or any other mechanism which is suitable to adjust the tension of the chain 200. These alternative embodiments of the binder 400 may require that both the chain fixed end 201 and the chain free end 202 of the chain 200 be fixed or free.

Figure 5:
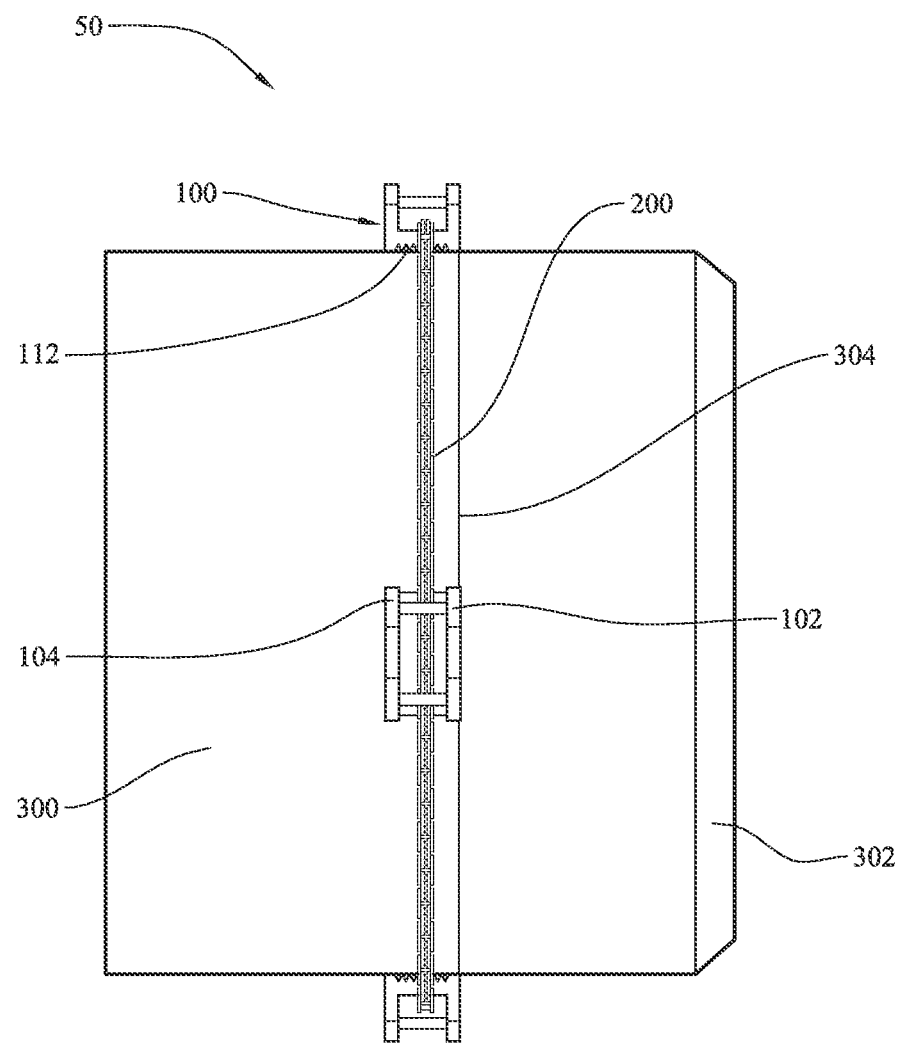
FIG. 5 presents a side view of an inner pipe with a chain and multiple clamps around the circumference of the inner pipe in exemplary application of an illustrative embodiment of the pipe homing tool.

Referring next to FIGS. 4-6, 9 and 10 of the drawings, in exemplary application, the pipe homing tool 50 may be used to ensure that an inner pipe segment 300 is properly homed to facilitate adjoining of the inner pipe segment 300 to an adjacent outer pipe segment 500 (FIG. 9). As illustrated in FIG. 5, the inner pipe segment 300 may have a spigot end 302 and a stop mark 304 which is spaced-apart from the spigot end 302. The stop mark 304 defines the depth to which the spigot end 302 is to be inserted into an outer bell 502 (FIG. 9) of the outer pipe segment 500 for proper homing of the inner pipe segment 300, as will be hereinafter described.

The chain free end 202 (FIG. 7) of the chain 200 is threaded through the clamp cavity 108 (FIG. 4) of each of the multiple clamps 100 and the binder housing interior 414 of the binder housing 402 of the binder 400. Care may be taken to ensure that no twists are present in the chain 200. As illustrated in FIG. 12, the chain 200 meshes with the gear teeth 407 on the chain gear 406 in the binder housing interior 414 of the binder 400. Accordingly, the chain 200 can be advanced through the binder housing 402 of the binder 400 and through the clamp cavity 108 (FIG. 4) of each clamp 100 by pivoting the binder lever 404 in the binder housing interior 414 of the binder housing 402. As shown in FIG. 6, the clamps 100 and the chain 200 are draped around the circumference of the pipe 300. The clamps 100 are then evenly spaced around the pipe 300 on the chain 200 and aligned with respect to the pipe 300 such that the proximal side wall 102 of each clamp 100 is aligned with the stop mark 304 (FIG. 5), the distal side wall 104 of each clamp 100 is spaced-apart from the spigot end 302 of the inner pipe segment 300 and the clamp bottom face 110 of each clamp 100 disposed in contact with the exterior surface of the pipe 300.

The chain 200 is next tensioned by pivoting the binder lever 404 in the binder housing interior 414 of the binder 400 until the clamps 100 are tightened and become immobilized against the exterior surface of the inner pipe segment 300. Once the clamps 100 are immobilized, the spigot end 302 of the inner pipe segment 300 is inserted into the companion outer bell 502 of the receiving outer pipe segment 500, thereby forming a pipe joint 600 (FIG. 10) between the inner pipe segment 300 and the outer pipe segment 500. The inner pipe segment 300 may be inserted into the outer pipe segment 500 until the clamps 100 of the pipe housing tool 50 contact the outer bell 502 of the outer pipe segment 500. At this point, a gasket 504 (FIG. 9) may form a seal between the inner pipe segment 300 and the outer pipe segment 500 and the inner pipe segment 300 is properly homed. Upon completion of the homing operation, the chain 200 may be released from the binder 400 and the clamps 100, the chain 200, and the binder 400 may be removed from the pipe 300.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A pipe homing tool, comprising:
   at least three clamps, each clamp having a base wall having an upper surface defining a clamp cavity and a lower surface defining a clamp bottom face and at least one side wall extending generally perpendicular from an edge of the base wall, wherein said at least one side wall has an exterior, pipe homing surface;

a section of chain extending through said clamp cavity of each clamp, said section of chain being able to adopt a looped arrangement for engaging an exterior surface of a first pipe section;

a binder engaging said chain and adapted to selectively shorten and lengthen said section of chain; wherein the at least three clamps are movable about said section of chain, allowing to adjust the spacing between the clamps, and allowing to adjust the relative position of the corresponding at least three clamp pipe homing surfaces so that said at least three pipe homing surfaces can adopt a relative position in which said at least three pipe homing surfaces are arranged in a coplanar manner that provides an abutment plane for limiting axial motion of a terminal end of a mating pipe section.

2. The pipe homing tool of claim 1, wherein at least one clamp further comprises a second side wall extending generally perpendicular from a second edge of said base wall, wherein said second edge is located opposite said first edge refining said clamp cavity into a cross sectional "U" shape.

3. The pipe homing tool of claim 2 further comprising at least one clamp support rod extending between said first side wall and said second side wall in said clamp cavity.

4. The pipe homing tool of claim 2 wherein said clamp bottom face further comprises a plurality of clamp teeth formed thereon.

5. The pipe homing tool of claim 1 wherein said section of chain comprises a chain fixed end attached to said binder and a chain free end opposite said chain fixed end and adjustably engaged by said binder.

6. The pipe homing tool of claim 5 wherein said binder comprises a binder housing having a binder housing interior, a chain gear rotatably mounted in said binder housing interior and engaging said chain and a binder lever engaging said chain gear.

7. The pipe homing tool of claim 6 wherein said binder housing comprises a pair of spaced-apart binder housing sidewalls and a binder housing connecting wall connecting said binder housing sidewalls, and wherein said chain gear is rotatably mounted between said binder housing sidewalls.

8. The pipe homing tool of claim 6 further comprising a ratchet mechanism engaging said chain gear.

9. A pipe homing tool, comprising:

at least three clamps, each clamp having a base wall having an upper surface defining a clamp cavity and a lower surface defining a clamp bottom face and at least one side wall extending generally perpendicular from an edge of the base wall, wherein said at least one side wall has an exterior, pipe homing surface;

a section of chain disposed in a generally circular configuration and extending through said clamp cavity of each clamp said generally circular configuration allowing the section of chain to be able to engage an exterior surface of a first pipe section; and a binder engaging said chain and adapted to selectively shorten and lengthen said section of chain; wherein the at least three clamps are movable about said section of chain, allowing to adjust the spacing between the clamps, and allowing to adjust the relative position of the corresponding at least three clamp pipe homing surfaces so that said at least three pipe homing surfaces can adopt a relative position in which said at least three pipe homing surfaces are arranged in a coplanar manner that provides an abutment plane for limiting axial motion of a terminal end of a mating pipe section.

10. The pipe homing tool of claim 9, wherein at least one clamp further comprises a second side wall extending generally perpendicular from a second edge of said base wall, wherein said second edge is located opposite said first edge refining said clamp cavity into a cross sectional "U" shape.

11. The pipe homing tool of claim 10 further comprising at least one clamp support rod extending between said first side wall and said second side wall in said clamp cavity.

12. The pipe homing tool of claim 10 wherein said clamp bottom face further comprises a plurality of clamp teeth formed thereon.

13. The pipe homing tool of claim 9 wherein said section of chain comprises a chain fixed end attached to said binder and a chain free end opposite said chain fixed end and adjustably engaged by said binder.

14. The pipe homing tool of claim 13 wherein said binder comprises a binder housing having a binder housing interior, a chain gear rotatably mounted in said binder housing interior and engaging said chain and a binder lever engaging said chain gear.

15. The pipe homing tool of claim 14 wherein said binder housing comprises a pair of spaced-apart binder housing sidewalls and a binder housing connecting wall connecting said binder housing sidewalls, and wherein said chain gear is rotatably mounted between said binder housing sidewalls.

16. The pipe homing tool of claim 14 further comprising a ratchet mechanism engaging said chain gear.

17. A method for connecting or homing a terminal end of a mating pipe section onto an exterior surface of a first pipe section, said method comprising the steps of:

a) providing a pipe homing tool comprising:

at least three clamps, each clamp having a base wall having an upper surface defining a clamp cavity and a lower surface defining a clamp bottom face and at least one side wall extending generally perpendicular from an edge of the base wall, wherein said at least one side wall has an exterior, pipe homing surface;

a section of chain extending through said clamp cavity of each clamp, said section of chain being able to adopt a circular arrangement for engaging the exterior surface of the first pipe section;

a binder engaging said chain and adapted to selectively shorten and lengthen said section of chain; wherein the at least three clamps are movable about said section of chain, allowing to adjust the spacing between the clamps, and allowing to adjust the relative position of the corresponding at least three clamp pipe homing surfaces so that said at least three pipe homing surfaces can adopt a relative position in which said at least three pipe homing surfaces are arranged in a coplanar manner that provides an abutment plane for limiting axial motion of the terminal end of the mating pipe section;

b) placing the chain section around the exterior surface of the first pipe section;

c) spacing the clamps around the inner pipe section, and adjusting the axial position of the clamps so that the clamp pipe homing surfaces are arranged in a coplanar manner;

d) tightening the chain using the binder;

e) inserting the terminal end of the mating pipe section onto the exterior surface of the first pipe section until the terminal end contacts the coplanar pipe homing surfaces; and f) removing the pipe homing tool from the first pipe section.

18. The method of claim 17, wherein the step of adjusting the axial position of the clamps comprises a step of aligning the clamps with respect to a mark provided on the exterior surface of the first pipe section.

19. The method of claim 17, wherein the step of spacing the clamps around the inner pipe section includes spacing the clamps evenly around the inner pipe section.

\* \* \* \* \*